United States Patent
Wei

(10) Patent No.: US 11,012,244 B2
(45) Date of Patent: May 18, 2021

(54) NETWORK NODE ENCRYPTION METHOD AND APPARATUS

(71) Applicant: TENCENT TECHNOLOGY (SHENZHEN) COMPANY LIMITED, Shenzhen (CN)

(72) Inventor: Wei Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 154 days.

(21) Appl. No.: 15/973,583

(22) Filed: May 8, 2018

(65) Prior Publication Data

US 2018/0262350 A1    Sep. 13, 2018

Related U.S. Application Data

(63) Continuation of application No. PCT/CN2017/094021, filed on Jul. 24, 2017.

(30) Foreign Application Priority Data

Aug. 19, 2016 (CN) .......................... 201610692426.7

(51) Int. Cl.
- *H04L 29/00* (2006.01)
- *H04L 9/32* (2006.01)
- *H04L 29/06* (2006.01)

(52) U.S. Cl.
CPC ............ *H04L 9/3268* (2013.01); *H04L 9/321* (2013.01); *H04L 63/0428* (2013.01); *H04L 63/0823* (2013.01)

(58) Field of Classification Search
CPC ..... H04L 67/02; H04L 67/42; H04L 67/2838; H04L 67/10; H04L 67/14
See application file for complete search history.

(56) References Cited

U.S. PATENT DOCUMENTS

| 6,510,513 B1* | 1/2003 | Danieli ................ G06F 21/64 |
| | | 380/279 |
| 2013/0138957 A1* | 5/2013 | Dharmarajan ........ H04L 63/068 |
| | | 713/168 |

(Continued)

FOREIGN PATENT DOCUMENTS

| CN | 101527634 A | 9/2009 |
| CN | 102932762 A | 2/2013 |
| CN | 106302476 A | 1/2017 |

OTHER PUBLICATIONS

International Search Report dated Nov. 1, 2017 in PCT/CN2017/094021, filed Jul. 24, 2017 (w/ English translation) 6 pp.

*Primary Examiner* — Ghazal B Shehni
(74) *Attorney, Agent, or Firm* — Oblon, McClelland, Maier & Neustadt, L.L.P.

(57) ABSTRACT

A method for network node encryption is provided. Signals that carry a node encryption request from a client for a network node is received by an apparatus. Subsequently, node data information of the network node according to the node encryption request is acquired by the apparatus. The node data information includes a preset link. Next, an application to a trusted third party for an encryption certificate is transmitted via the apparatus and the application includes the node data information. The trusted third party sends a certificate verification request including a verification file once the application is received to verify an authority to the preset link. The certificate verification request is received and the verification file is stored subsequently. The trusted third party verifies the storing of the verification file and sends an encryption certificate. The encryption certificate is received and deployed on the network node via the apparatus.

20 Claims, 7 Drawing Sheets

(56) References Cited

U.S. PATENT DOCUMENTS

2014/0269431 A1  9/2014  Larson
2016/0241405 A1* 8/2016  Jeong .................... H04L 63/062

* cited by examiner

NETWORK NODE ENCRYPTION METHOD AND APPARATUS

RELATED APPLICATION

This application is a continuation of International Application No. PCT/CN2017/094021 filed on Jul. 24, 2017, which claims priority to Chinese Patent Application No. 201610692426.7, entitled "NETWORK NODE ENCRYPTION METHOD AND APPARATUS" filed on Aug. 19, 2016. The entire disclosures of the prior applications are hereby incorporated by reference in their entirety.

FIELD OF THE TECHNOLOGY

The present application relates to the field of Internet.

BACKGROUND OF THE DISCLOSURE

A CDN (Content delivery network) is a computer network system interconnected by the Internet and may send music, pictures, videos, application programs and other files to other users more rapidly and reliably by using a server closest to each user so as to provide network contents with high performance, expandability and low cost.

In order to improve the security of a CDN node, a network content provider generally encrypts the CDN node.

SUMMARY

The embodiments of the present application provide a network node encryption method and apparatus capable of automatically encrypting a network node so as to improve the security of the network node.

In an embodiment of the present application, a method for network node encryption is provided. A node encryption request from a client for a network node is received by interface circuitry of an apparatus for controlling network nodes. Subsequently, node data information of the network node in response to the node encryption request is acquired by processing circuitry of the apparatus. The node data information includes a preset link. Next, an application to a trusted third party for an encryption certificate is transmitted and the application includes the node data information. The trusted third party sends a certificate verification request including a verification file once the application is received to verify an authority to the preset link. The certificate verification request is received and the verification file is stored subsequently to a network address or a network memory space corresponding to the preset link of the network node. The trusted third party verifies the storing of the verification file and sends an encryption certificate. The encryption certificate is received and deployed on the network node by the apparatus.

In another embodiment of the present application, an apparatus is provided. The apparatus includes interface circuitry configured to receive and transmit signals that carry messages and processing circuitry. The interface circuitry receives a node encryption request for a network node. Once the request is received, the processing circuitry acquires node data information of the network node from a network node information database in response to the node encryption request, and the node data information includes a preset link. Subsequently, the interface circuitry transmits an application to a trusted third party for an encryption certificate, and the application incudes the node data information. The third party receives the application and sends a certificate verification request to the apparatus. The interface circuitry of the apparatus receives the certificate verification request from the trusted third party. The certificate verification request includes a verification file to be used to verify an authority to the preset link, and the certificate verification request is generated by the trusted third party in response to the application for the encryption certificate. The processing circuitry then stores the verification file according to the preset link of the network node to associate the verification file with the preset link in response to the certificate verification request, and the interface circuitry transmits a message to the trusted third party to inform the completion of the storing the verification file according to the preset link of the network node. The trusted third party verifies the storing of the verification file and sends an encryption certificate. The interface circuitry receives the encryption certificate from the trusted third party, and the processing circuitry deploys the encryption certificate on the network node.

In another embodiment, a method for network node encryption is provided. In the disclosed method, an encryption certificate application from a second apparatus that controls network nodes is received by interface circuitry of a first apparatus for providing encryption certificates. The encryption certificate application includes node data information of a network node, and the node data information includes a preset link. Next, a certificate verification request in response to the encryption certificate application is generated by processing circuitry of the first apparatus. The certificate verification request includes a verification file to be used to verify an authority to the preset link. The interface circuitry of the first apparatus then sends the certificate verification request to the second apparatus. A message fed back by the second apparatus in response to the certificate verification request is then received via the interface circuitry of the first apparatus. The message informs the first apparatus the completion of storing the verification file according to the preset link of the network node. A corresponding encryption certificate is therefore generated by processing circuitry of the first apparatus in response to the message. The encryption certificate is then sent to the second apparatus via the interface circuitry of the first apparatus.

In another embodiment of the present application, a network node encryption apparatus in a trusted third party is disclosed. The apparatus in the trusted third party includes processing circuitry. The processing circuitry is configured to receive an encryption certificate application from a network node encryption apparatus. The processing circuitry then generates a certificate verification request in response to the encryption certificate application. The encryption certificate application includes node data information of a network node, and the node data information includes a preset link, and the certificate verification request includes a verification file that verifies an authority to the preset link. The processing circuitry then sends the certificate verification request to the network node encryption apparatus. The processing circuitry subsequently receives a message fed bac by the network node encryption apparatus in response to the certificate verification request from the third party. The message informs the trusted third party the completion of storing the verification file according to the preset link of the network node. The processing circuitry accordingly generates a corresponding encryption certificate based on a determination that the verification file is stored to a network address or a network memory space corresponding to the preset link of the network node. The processing circuitry then sends the encryption certificate to the network node encryption apparatus.

In another embodiment, a non-transitory computer-readable storage medium in a trusted third party is provided. The non-transitory computer-readable storage medium stores a program executable by a processor in the trusted third party to receive an encryption certificate application from a network node encryption apparatus, and generate a certificate verification request in response to the encryption certificate application. The encryption certificate application includes node data information of a network node, and the node data information includes a preset link, and the certificate verification request includes a verification file that verifies an authority to the preset link. Subsequently, the program that is stored in the medium and executable by the processor in the trusted third party sends the certificate verification request to the network node encryption apparatus. The program executable by the processor in the trusted third party receives a message fed back by the network node encryption apparatus in response to the certificate verification request from the third party. The message informs the third party the completion of storing the verification file according to the preset link of the network node. The program executable by the processor in the trusted third party then generates a corresponding encryption certificate based on a determination that the verification file is stored to a network address or a network memory space corresponding to the preset link of the network node and sends the encryption certificate to the network node encryption apparatus.

In another embodiment, a non-transitory computer-readable storage medium is provided. The non-transitory computer-readable storage medium stores a program executable by a processor to receive a node encryption request for a network node, and acquire node data information of the network node according to the node encryption request. The node data information includes a preset link. The program executable by the processor further transmits an application to a trusted third party for an encryption certificate, and application includes the node data information. The program executable by the processor then receives a certificate verification request from the trusted third party. The certificate verification request includes a verification file that verifies an authority to the preset link, and the certificate verification request is generated by the trusted third party in response to the application for the encryption certificate. The program executable by the processor then stores the verification file according to the preset link of the network node to associate the verification file with the preset link in response to the certificate verification request. The program executable by the processor further transmits a message to the trusted third party to inform the completion of the storing the verification file according to the preset link of the network node. The program executable by the processor then receives the encryption certificate from the trusted third party, and deploys the encryption certificate on the network node. The encryption certificate is generated by the trusted third party in response to the correlation result.

DESCRIPTION OF EMBODIMENTS

Figure 1:
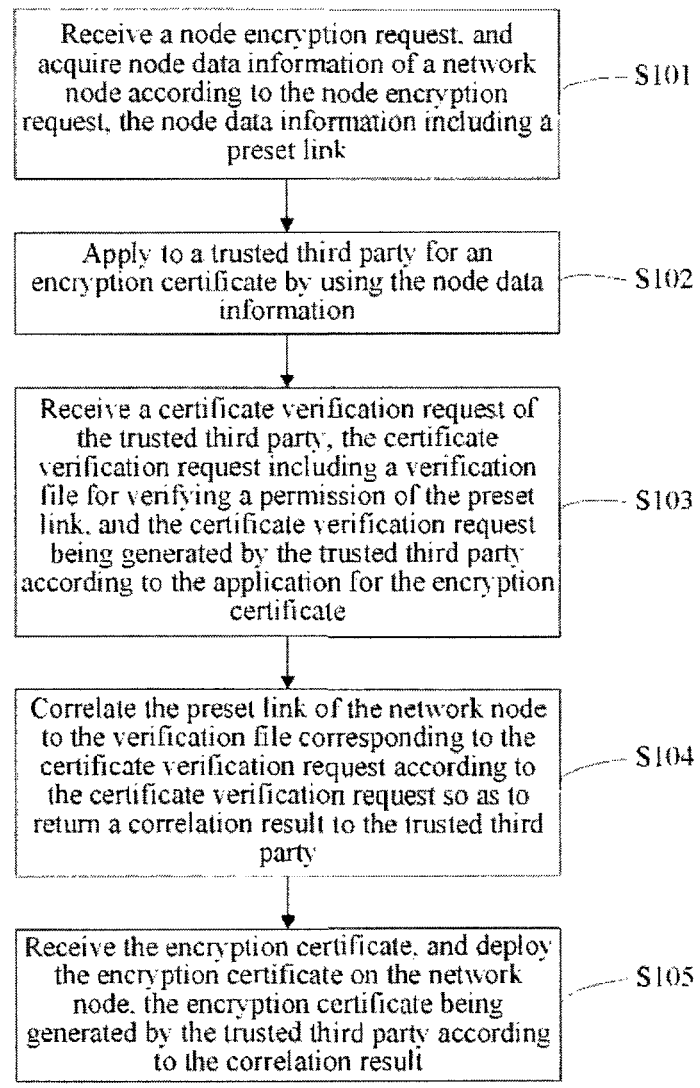
FIG. 1 is a flow diagram of an embodiment of a network node encryption method of the present application.

Referring to the accompanying drawings, the same component symbols represent for same components, and the principle of the present application is described for exemplary purposes by implementation in an appropriate computing environment. The following description is based on illustrated specific embodiments of the present application and should not be regarded as a limitation to other specific embodiments of the present application not described in detail herein.

In the following description, the specific embodiments of the present application will be described by reference to steps and symbols of operations executed by one or more computers, unless otherwise noted. Therefore, the steps and the operations may be known, wherein it is mentioned several times that the operations are executed by the computer including a computer processing unit representing for an electronic signal of data in a structural form. By virtue of the operation, the data is converted or is maintained on a position in a memory system of the computer, the position may be reconfigured, or furthermore, the operation of the computer may be changed in a way well known by a person skilled in the art. A data structure maintained by the data is located on an entity position of the memory and has a specific characteristic defined by a data format. However, the principle of the present application is described by the above texts, but does not represent for a limitation, and the person skilled in the art may know about the following various steps and operations which may also be executed in hardware.

In some examples, a process of encrypting a CDN node includes:

Firstly, provide, by a network content provider, basic data, such as a network node name, network domain name information and a certificate secure request (CSR), of a network node for a trusted third party so as to apply to the trusted third party for a certificate.

Secondly, verify the network domain name information of the network node so as to affirm an ownership of the network content provider to the network node after the trusted third party audits the basic data of the network content provider.

Thirdly, send a certificate downloading address to the network content provider so as to be convenient for the network content provider to download an encryption certificate after the trusted third party finishes the verification of the network domain name information of the network node.

Fourthly, upload, by the network content provider, the encryption certificate to a console of the CDN node, deploy the certificate on the console of the CDN node by using the encryption certificate, and verify, by the console, the match ability of a public key and a private key in the encryption certificate so as to finish the deployment of the encryption certificate.

In the above encryption operation process, the network content provider needs to download and upload the encryption certificate, the risk that the encryption certificate is leaked happens very easily in a process that a user stores and uploads the encryption certificate, and thus, the security of the CDN node is affected.

A network node encryption method and apparatus of the present application may be used for various electronic devices, such as a CDN node server, for network node management. The user may automatically finish the application for the encryption certificate to the trusted third party by using the electronic devices and performs an encryption operation process on the CDN node by using the encryption certificate, so that the leakage of the encryption certificate is avoided, and the security of the network node is improved.

Referring to FIG. 1, FIG. 1 is a flow diagram of an embodiment of a network node encryption method of the present application. The network node encryption method in the embodiment may be implemented by using the electronic devices and includes:

Step S101: Receive a node encryption request, and acquire node data information of a network node according to the node encryption request, the node data information including a preset link.

Step S102: Apply to a trusted third party for an encryption certificate by using the node data information.

Step S103: Receive a certificate verification request of the trusted third party, the certificate verification request including a verification file for verifying a permission (or authority) to the preset link, and the certificate verification request being generated by the trusted third party according to the application for the encryption certificate.

Step S104: Correlate (or associate) the preset link of the network node to the verification file corresponding to the certificate verification request in response to the certificate verification request so as to return (or transmit) a correlation result to the trusted third party. In the present disclosure, correlating the preset link of the network node to the verification file includes storing the verification file to a network address or a network memory space corresponding to the preset link of the network node to associate the verification file with the preset link. The correlation result disclosed herein is a message to inform the completion of the storing the verification file according to the preset link of the network node.

Step S105: Receive the encryption certificate, and deploy the encryption certificate on the network node, the encryption certificate being generated by the trusted third party according to the correlation result.

A detailed process of each step of the network node encryption method in the embodiment is described in detail below.

In step S101, the network node encryption apparatus receives the node encryption request of a client terminal, and the node encryption request is a request that the user of the client terminal applies to a network node corresponding to the trusted third party for the encryption certificate so as to encrypt the network node.

Then, the network node encryption apparatus acquires the node data information of the network node from a preset database according to the node encryption request. The preset database described herein is configured to prestore the node data information of the network node; the node data information includes, but is not limited to, information such as a node name, network domain name information, a preset link and a certificate secure request of the network node, wherein the preset link of the network node refers to a link correlated to a domain name of a terminal network node in the network node encryption apparatus. The preset link may be a network address or a network memory space and the like. The trusted third party may verify the network node according to the node data information. Then, go to step S102.

In step S102, the network node encryption apparatus applies to the trusted third party for the encryption certificate according to the node data information acquired in step S101, the node data information including the preset link.

The application for the encryption certificate herein refers to a request that the network node encryption apparatus applies to the trusted third party for the encryption certificate. The trusted third party herein is an entity, trusted by both communication parties, of a PKI (Public Key Infrastructure) system. Then, go to step S103.

In step S103, the trusted third party receives the application for the encryption certificate, sent by the network node encryption apparatus, and generates the certificate verification request according to the application for the encryption certificate. The certificate verification request refers to a request that the trusted third party verifies the application permission for the encryption certificate of the network node encryption apparatus. The certificate verification request should include a verification file, and the trusted third party downloads the verification file via a correlated link to determine a control right of the network node encryption apparatus to the correlated link. The trusted third party sends the certificate verification request to the network node encryption apparatus. Then, go to step S104.

In step S104, the network node encryption apparatus receives the certificate verification request, correlates the preset link of the network node to the verification file corresponding to the certificate verification request according to the certificate verification request, and then, returns the correlation result to the trusted third party, so that the trusted third party verifies the permission of the network node of the network node encryption apparatus. The network node encryption apparatus correlates the preset link of the network node to the verification file corresponding to the certificate verification request, namely the network node encryption apparatus uploads the verification file to the network address or the network memory space corresponding to the preset link of the network node. The correlation result shows that the verification file has been uploaded to the network address or the network memory space corresponding to the preset link of the network node. Then, go to step S105.

In step S105, the trusted third party receives the correlation result of the network node encryption apparatus and affirms the correlation between the preset link of the network node and the verification file according to the correlation result. Namely, the trusted third party accesses the network address or the network memory space corresponding to the preset link of the network node in the application for the encryption certificate, received in step S103, to affirm whether the verification file may be downloaded from the network address or the network memory space or not after receiving the correlation result returned by the network node encryption apparatus and used for showing that the verification file has been uploaded to the network address or the network memory space corresponding to the preset link of the network node. The corresponding encryption certificate is generated and sent to the network node encryption apparatus if it is determined that the correlation exists between the preset link of the network node and the verification file, namely the trusted third party may access and download the verification file from the network address or the network memory space.

The network node encryption apparatus receives the encryption certificate, and then, deploys the encryption certificate on the network node to finish the encryption operation of the network node.

Therefore, the encryption operation process of the network node of the network node encryption method in the embodiment is finished.

According to the network node encryption method in the embodiment, the encryption certificate is automatically applied for from the trusted third party by using the node data information of the network node, and the network node is encrypted by using the encryption certificate, so that the leakage of the encryption certificate is avoided, and the security of the network node is improved.

Figure 2:
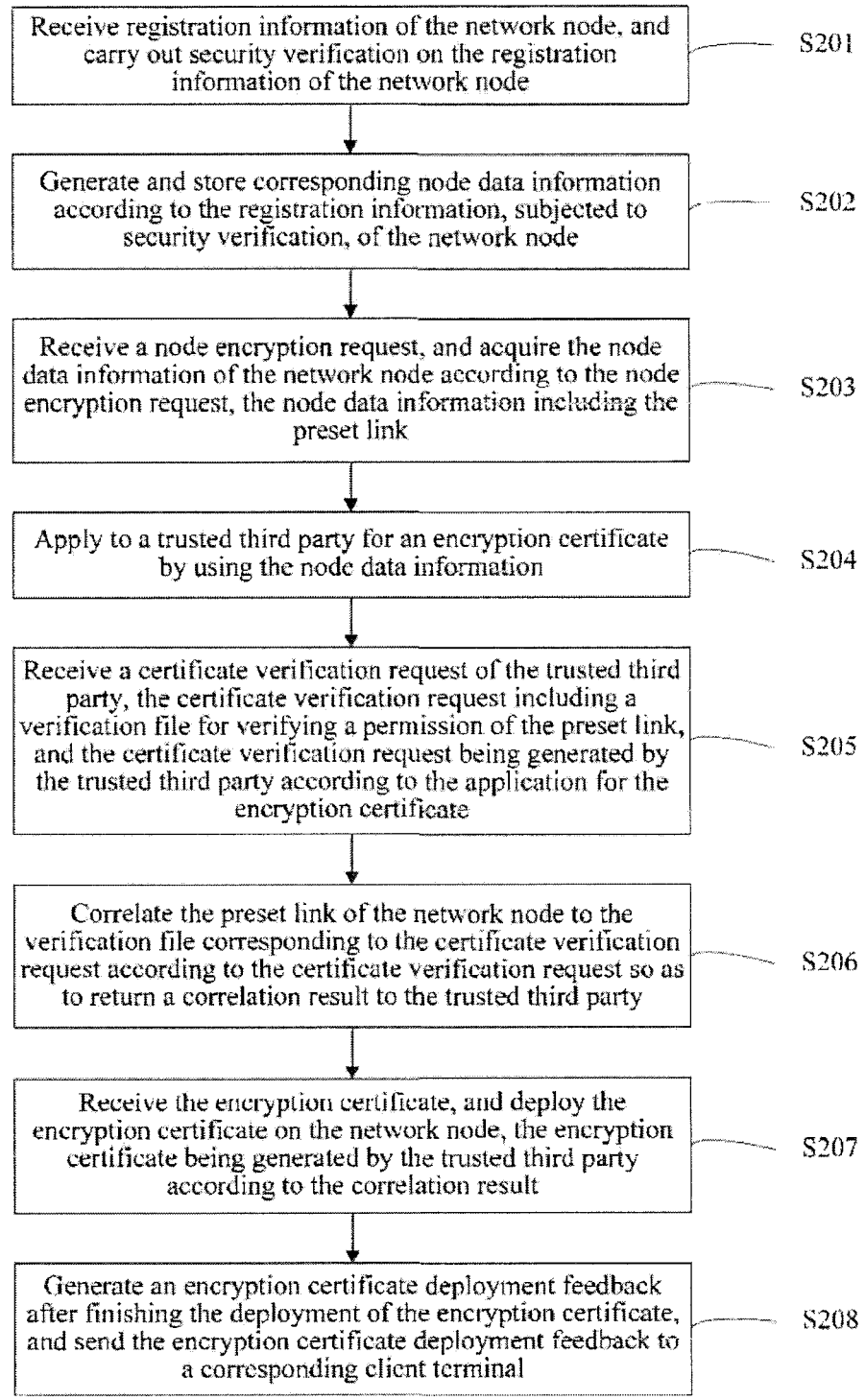
FIG. 2 is a flow diagram of the embodiment of the network node encryption method of the present application.

Referring to FIG. 2, FIG. 2 is a flow diagram of the embodiment of the network node encryption method of the present application. The network node encryption method in the embodiment may be implemented by using the electronic devices and includes:

Step S201: Receive registration information of the network node, and carry out security verification on the registration information of the network node.

Step S202: Generate and store corresponding node data information according to the registration information, subjected to security verification, of the network node.

Step S203: Receive a node encryption request, and acquire the node data information of the network node according to the node encryption request, the node data information including a preset link.

Step S204: Apply to a trusted third party for an encryption certificate by using the node data information.

Step S205: Receive a certificate verification request of the trusted third party, the certificate verification request including a verification file for verifying a permission of the preset link, and the certificate verification request being generated by the trusted third party according to the application for the encryption certificate.

Step S206: Correlate the preset link of the network node to the verification file corresponding to the certificate verification request according to the certificate verification request so as to return a correlation result to the trusted third party, the certificate verification request being generated by the trusted third party according to the application for the encryption certificate.

Step S207: Receive the encryption certificate, and deploy the encryption certificate on the network node, the encryption certificate being generated by the trusted third party according to the correlation result.

Step S208: Generate an encryption certificate deployment feedback after finishing the deployment of the encryption certificate, and send the encryption certificate deployment feedback to a corresponding client terminal.

A detailed process of each step of the network node encryption apparatus in the embodiment is described in detail below.

The network node in the embodiment is, for example, a CDN node, a content provider may generally make a content on a terminal network node, however, the terminal network node is not beneficial to the rapid spread of the content due to flow and territorial limitations. Therefore, the content provider may generally register the CDN node, the CDN node is correlated to the terminal network node, and thus, the content may be rapidly spread by the CDN node hardly having flow and territorial limitations.

In step S201, the network node encryption apparatus receives the registration information of the network node of the corresponding client terminal, the network node herein is, for example, the CDN node, and thus, the correlation between the terminal network node and the CDN node is realized; of course, the node data information of the terminal network node may also be directly submitted as the registration information of the network node.

Then, the network node encryption apparatus carries out security verification on the registration information of the network node so as to guarantee the truth of the registration information of the network node. Then go to step S202.

In step S202, the network node encryption apparatus generates and stores the node data information corresponding to the network node according to the registration information, subjected to security verification in step S201, of the network node. The node data information includes, but is not limited to, information such as a node name, network domain name information, a preset link and a certificate secure request of the network node, wherein the preset link of the network node refers to a link correlated to the domain name of the terminal network node in the network node encryption apparatus. Therefore, the network node encryption apparatus may store the node data information of a plurality of network nodes to form a preset database. Then, go to step S203.

In step S203, the network node encryption apparatus receives the node encryption request of the client terminal, and the node encryption request is a request that the user of the client terminal applies to the network node corresponding to the trusted third party for the encryption certificate so as to encrypt the network node.

Figure 3:
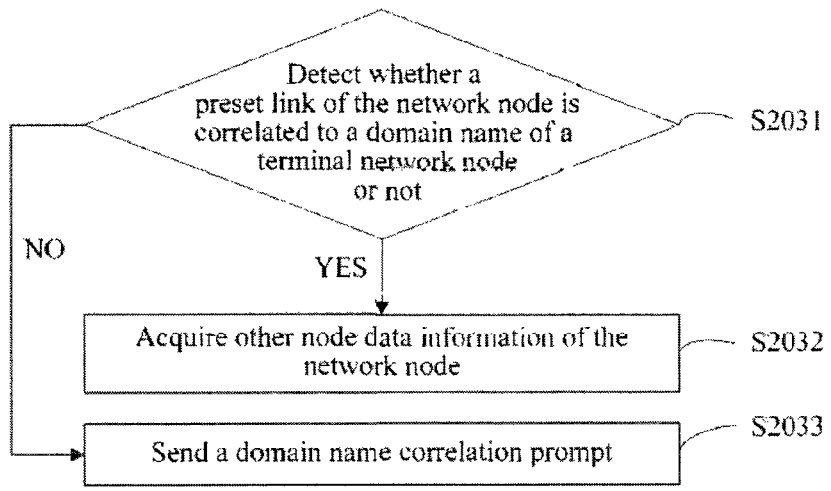
FIG. 3 is a flow diagram of step S203 in the embodiment of the network node encryption method of the present application.

Then, the network node encryption apparatus acquires the node data information of the network node from the preset database according to the node encryption request. For example, referring to FIG. 3, FIG. 3 is a flow diagram of step S203 in the embodiment of the network node encryption method of the present application. Step S203 includes:

Step S2031: Receive, by the network node encryption apparatus, the node encryption request, and detect whether a preset link of the network node is correlated to the domain name of the terminal network node or not according to the node encryption request, namely judge whether the node data information in the preset database is valid or not, for example, judge whether a correlated content on the domain name of the terminal network node may be accessed or not by the preset link of the network node, wherein the preset link may be a network address or a network memory space and the like.

Go to step S2032 if the preset link of the network node is correlated to the domain name of the terminal network node; and go to step S2033 if the preset link of the network node is not correlated to the domain name of the terminal network node.

Step S2032: Correlate the preset link of the network node to the domain name of the terminal network node, determine, by the network node encryption apparatus, that the node data information in the preset database is valid, and acquire other node data information of the network node, wherein the trusted third party may verify the network node according to the node data information. Then, go to step S204.

Step S2033: Determine, by the network node encryption apparatus, that the node data information in the preset database is invalid if the preset link of the network node is not correlated to the domain name of the terminal network node, send a domain name correlation prompt to the corresponding client terminal to prompt the user to correlate the domain name of the terminal network node to the preset link of the network node so as to facilitate the automatic application operation of the encryption certificate.

Figure 4:
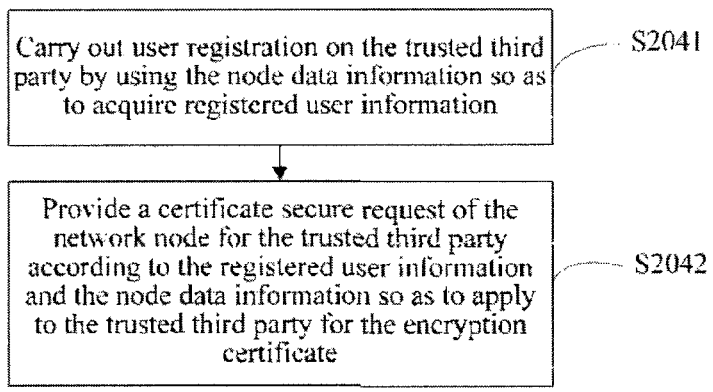
FIG. 4 is a flow diagram of step S204 in the embodiment of the network node encryption method of the present application.

In step S204, the network node encryption apparatus applies to the trusted third party for the encryption certificate according to the node data information acquired in step S203, the node data information including the preset link. The application for the encryption certificate herein refers to a request that the network node encryption apparatus applies to the trusted third party for the encryption certificate. The trusted third party herein is an entity, trusted by both communication parties, of a PKI (Public Key Infrastructure) system. For example, referring to FIG. 4, FIG. 4 is a flow diagram of step S204 in the embodiment of the network node encryption method of the present application. Step S204 includes:

Step S2041: Carry out, by the network node encryption apparatus, user registration on the trusted third party by using the node data information acquired in step S203 so as to acquire registered user information.

The trusted third party provides service for applying for the encryption certificate for a registered user, and therefore, the network node encryption apparatus carries out user registration on the trusted third party by using the node data information in the step; and the node data information is subjected to security verification and validity verification, and therefore, the success rate of user registration on the trusted third party is very high.

Step S2042: Provide, by the network node encryption apparatus, a certificate secure request of the network node for the trusted third party according to the registered user information acquired in step S2041 and the node data information so as to apply to the trusted third party for the encryption certificate. Then, go to step S205.

In step S205, the trusted third party receives the application for the encryption certificate, sent by the network node encryption apparatus, and generates a certificate verification request according to the application for the encryption certificate. The application for the encryption certificate refers to a request that the trusted third party verifies the application permission for the encryption certificate of the network node encryption apparatus. The certificate verification request should include a verification file, and the trusted third party downloads the verification file via a correlated link to determine a control right of the network node encryption apparatus to the correlated link. The trusted third party sends the certificate verification request to the network node encryption apparatus. Then, go to step S206.

Figure 5:
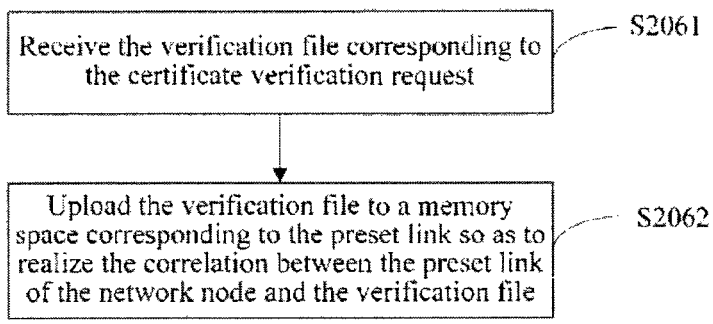
FIG. 5 is a flow diagram of step S206 in the embodiment of the network node encryption method of the present application.

In step S206, the network node encryption apparatus receives the certificate verification request and correlates the preset link of the network node to the verification file corresponding to the certificate verification request according to the certificate verification request. For example, referring to FIG. 5, FIG. 5 is a flow diagram of step S206 in the embodiment of the network node encryption method of the present application. Step S206 includes:

Step S2061: Receive, by the network node encryption apparatus, the verification file corresponding to the certificate verification request from the trusted third party.

Step S2062: Upload, by the network node encryption apparatus, the verification file to the memory space corresponding to the preset link so as to realize the correlation between the preset link of the network node and the verification file.

Then, the correlation result is returned to the trusted third party, so that the trusted third party verifies the permission of the network node of the network node encryption apparatus. The correlation result shows that the verification file has been uploaded to the network address or the network memory space corresponding to the preset link of the network node. Then, go to step S207.

In step S207, the trusted third party receives the correlation result of the network node encryption apparatus and affirms the correlation between the preset link of the network node and the verification file according to the correlation result. Namely, the trusted third party accesses the network address or the network memory space corresponding to the preset link of the network node, received in step S205, to affirm whether the verification file may be downloaded from the network address or the network memory space or not after receiving the correlation result returned by the network node encryption apparatus and used for showing that the verification file has been uploaded to the network address or the network memory space corresponding to the preset link of the network node. The corresponding encryption certificate is generated and sent to the network node encryption apparatus if it is determined that the correlation exists between the preset link of the network node and the verification file, namely the trusted third party may access and download the verification file from the network address or the network memory space.

The network node encryption apparatus receives the encryption certificate, and then, deploys the encryption certificate on the network node. Then, go to step S208.

In step S208, the network node encryption apparatus generates the encryption certificate deployment feedback after finishing the deployment of the encryption certificate, and sends the encryption certificate deployment feedback to the corresponding client terminal so as to remind a user of finishing the encryption operation of the network node.

Therefore, the encryption operation process of the network node of the network node encryption method in the embodiment is finished.

The node data information is subjected to security verification and validity verification by using the network node encryption method in the embodiment on the basis of the above embodiments, so that the probability of verification failure of the trusted third party is reduced, and the success rate of encryption operation of the network node is further increased.

Figure 6:
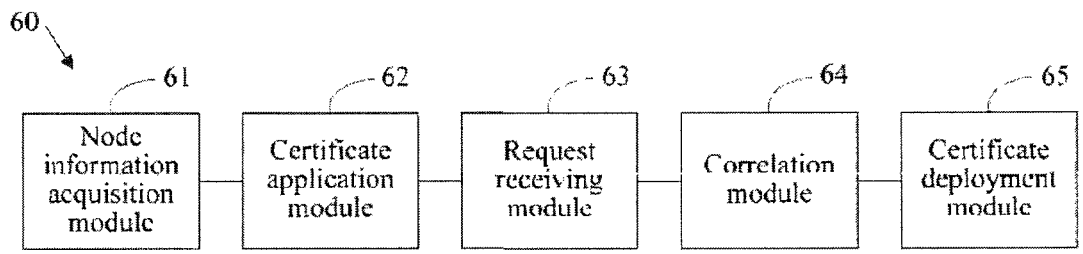
FIG. 6 is a schematic structural diagram of an embodiment of a network node encryption apparatus of the present application.

The present application further provides a network node encryption apparatus, referring to FIG. 6 which is a schematic structural diagram of an embodiment of a network node encryption apparatus of the present application, the network node encryption apparatus in the embodiment may be implemented by using the embodiment of the network node encryption method, and the network node encryption apparatus 60 in the embodiment includes a node information acquisition module 61, a certificate application module 62, a request receiving module 63, a correlation module 64 and a certificate deployment module 65.

The node information acquisition module 61 is configured to receive a node encryption request and acquire node data information of a network node according to the node encryption request, the node data information including a preset link; the certificate application module 62 is configured to apply to a trusted third party for an encryption certificate by using the node data information; the request receiving module 63 is configured to receive a certificate verification request of the trusted third party, the certificate verification request including a verification file for verifying a permission of the preset link, and the certificate verification request being generated by the trusted third party according to the application for the encryption certificate; the correlation module 64 is configured to correlate (or associate) the preset link of the network node to the verification file corresponding to the certificate verification request according to the certificate verification request so as to return (or transmit) a correlation result to the trusted third party; and the certificate deployment module 65 is configured to receive the encryption certificate and deploy the encryption certificate on the network node, the encryption certificate being generated by the trusted third party according to the correlation result. The correlation result disclosed herein is a message to inform the completion of the storing the verification file according to the preset link of the network node.

When the network node encryption apparatus 60 in the embodiment is used, firstly, the node information acquisition module 61 receives the node encryption request of the client terminal, and the node encryption request is a request that the user of the client terminal applies to the network node corresponding to the trusted third party for the encryption certificate so as to encrypt the network node.

Then, the node information acquisition module 61 acquires the node data information of the network node from a preset database according to the node encryption request. The preset database described herein is configured to pre-store the node information of the network node; the node data information includes, but is not limited to, information such as a node name, network domain name information, a preset link and a certificate secure request of the network node, wherein the preset link of the network node refers to a link correlated to a domain name of a terminal network node in the network node encryption apparatus. The preset link may be a network address or a network memory space and the like. The trusted third party verifies the network node according to the node data information.

Then, the certificate application module 62 applies to the trusted third party for the encryption certificate according to the node data information acquired by the node information acquisition module 61, the node data information including the preset link. The application for the encryption certificate herein refers to a request that the network node encryption apparatus applies to the trusted third party for the encryption certificate. The trusted third party herein is an entity, trusted by both communication parties, of a PKI (Public Key Infrastructure) system.

Next, the trusted third party receives the application for the encryption certificate, sent by the certificate application module 62, and generates the certificate verification request according to the application for the encryption certificate. The certificate verification request refers to a request that the trusted third party verifies the application permission for the encryption certificate of the network node encryption apparatus. The certificate verification request should include a verification file, and the trusted third party downloads the verification file via a correlated link to determine a control right of the network node encryption apparatus to the correlated link.

The trusted third party sends the certificate verification request to the request receiving module 63; the request receiving module 63 receives the certificate verification request, then, the correlation module 64 correlates the preset link of the network node to the verification file corresponding to the certificate verification request according to the certificate verification request, and then, returns a correlation result to the trusted third party, so that the trusted third party verifies the permission of the network node of the network node encryption apparatus. The correlation module 64 correlates the preset link of the network node to the verification file corresponding to the certificate verification request, namely the correlation module 64 uploads the verification file to a network address or a network memory space corresponding to the preset link of the network node. The correlation result shows that the verification file has been uploaded to the network address or the network memory space corresponding to the preset link of the network node.

Then, the trusted third party receives the correlation result of the correlation module 64 and affirms the correlation between the preset link of the network node and the verification file according to the correlation result. Namely, the trusted third party accesses the network address or the network memory space corresponding to the preset link of the network node in the received application for the encryption certificate to affirm whether the verification file may be downloaded from the network address or the network memory space or not after receiving the correlation result returned by the correlation module 64 and used for showing that the verification file has been uploaded to the network address or the network memory space corresponding to the preset link of the network node. The corresponding encryption certificate is generated and sent to the certificate deployment module 65 if it is determined that the correlation exists between the preset link of the network node and the verification file, namely the trusted third party may access and download the verification file from the network address or the network memory space.

Finally, the certificate deployment module 65 receives the encryption certificate, and then, deploys the encryption certificate on the network node to finish the encryption operation of the network node.

Therefore, the encryption operation process of the network node of the network node encryption apparatus 60 in the embodiment is finished.

According to the network node encryption apparatus in the embodiment, the encryption certificate is automatically applied from the trusted third party by using the node data information of the network node, and the network node is encrypted by using the encryption certificate, so that the leakage of the encryption certificate is avoided, and the security of the network node is improved.

Figure 7:
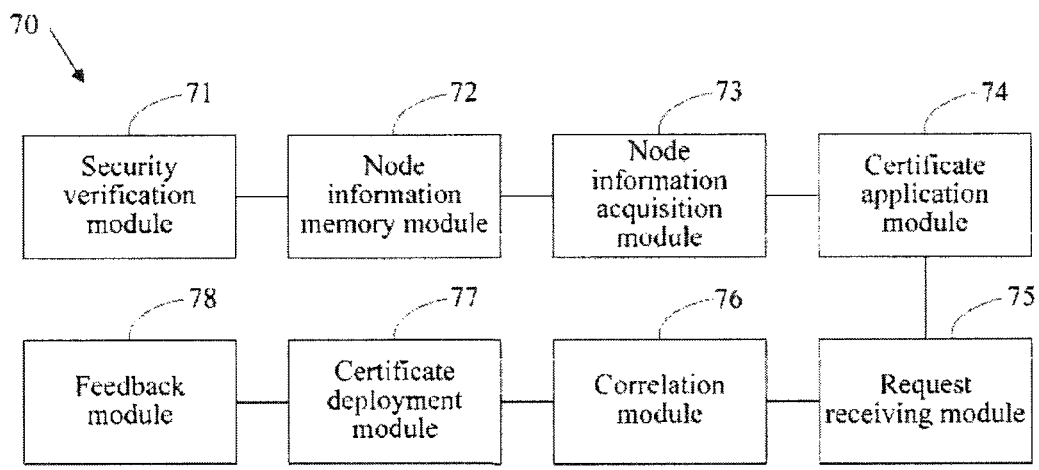
FIG. 7 is a schematic structural diagram of the embodiment of the network node encryption apparatus of the present application.

Referring to FIG. 7 which is a schematic structural diagram of the embodiment of the network node encryption apparatus of the present application, the network node encryption apparatus in the embodiment may be implemented by using the embodiment of the network node encryption method. The network node encryption apparatus 70 in the embodiment includes a security verification module 71, a node information memory module 72, a node information acquisition module 73, a certificate application module 74, a request receiving module 75, a correlation module 76, a certificate deployment module 77 and a feedback module 78.

The security verification module 71 is configured to receive registration information of the network node and carry out security verification on the registration information of the network node. The node information memory module 72 is configured to generate and store corresponding node data information according to the registration information, subjected to security verification, of the network node. The node information acquisition module 73 is configured to receive a node encryption request and acquire the node data information of the network node according to the node encryption request. The certificate application module 74 is configured to apply to a trusted third party for an encryption certificate by using the node data information. The request receiving module 75 is configured to receive a certificate verification request of the trusted third party, the certificate verification request including a verification file for verifying a permission of the preset link, and the certificate verification request being generated by the trusted third party according to the application for the encryption certificate. The correlation module 76 is configured to correlate the preset link of the network node to the verification file corresponding to the certificate verification request according to the certificate verification request so as to return a correlation result to the trusted third party. The certificate deployment module 77 is configured to receive the encryption certificate and deploy the encryption certificate on the network node, the encryption certificate being generated by the trusted third party according to the correlation result. The feedback module 78 is configured to generate an encryption certificate deployment feedback and send the encryption certificate deployment feedback to a corresponding client terminal.

Figure 8:
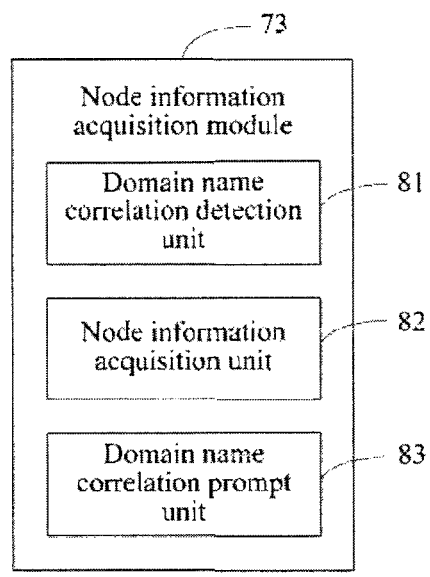
FIG. 8 is a schematic structural diagram of a node information acquisition module in the embodiment of the network node encryption apparatus of the present application.

Referring to FIG. 8, FIG. 8 is a schematic structural diagram of a node information acquisition module in the embodiment of the network node encryption apparatus of the present application. The node information acquisition module 73 includes a domain name correlation detection unit 81, a node information acquisition unit 82 and a domain name correlation prompt unit 83.

The domain name correlation detection unit 81 is configured to receive the node encryption request and detect whether the preset link of the network node is correlated to the domain name of the terminal network node or not according to the node encryption request. The node information acquisition unit 82 is configured to acquire other node data information of the network node if the preset link of the network node is correlated to the domain name of the terminal network node. The domain name correlation prompt unit 83 is configured to send a domain name correlation prompt if the preset link of the network node is correlated to the domain name of the terminal network node.

Figure 9:
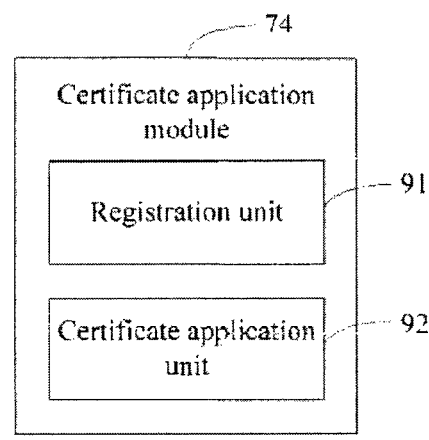
FIG. 9 is a schematic structural diagram of a certificate application module in the embodiment of the network node encryption apparatus of the present application.

Referring to FIG. 9, FIG. 9 is a schematic structural diagram of the certificate application module in the embodiment of the network node encryption apparatus of the present application. The certificate application module 74 includes a registration unit 91 and a certificate application unit 92.

The registration unit 91 is configured to carry out user registration on the trusted third party by using the node data information so as to acquire registered user information. The certificate application unit 92 is configured to provide a certificate secure request of the network node for the trusted third party according to the registered user information and the node data information so as to apply to the trusted third party for the encryption certificate.

Figure 10:
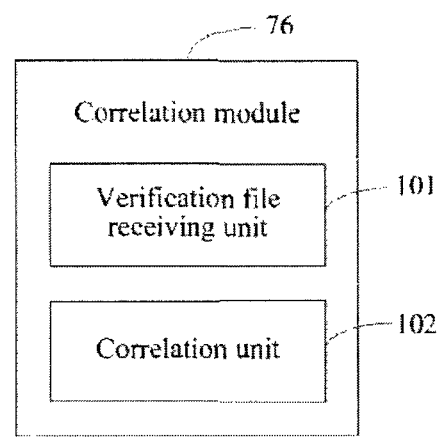
FIG. 10 is a schematic structural diagram of a correlation module in the embodiment of the network node encryption apparatus of the present application.

Referring to FIG. 10, FIG. 10 is a schematic structural diagram of the correlation module in the embodiment of the network node encryption apparatus of the present application. The correlation module 76 includes a verification file receiving unit 101 and a correlation unit 102.

The verification file receiving unit 101 is configured to receive the verification file corresponding to the certificate verification request. The correlation unit 102 is configured to upload the verification file to the memory space corresponding to the preset link so as to realize the correlation between the preset link of the network node and the verification file.

When the network node encryption apparatus 70 in the embodiment is used, the security verification module 71 receives the registration information of the network node at the corresponding client terminal. The network node herein is, for example, a CDN node, and thus, the correlation between the terminal network node and the CDN node is realized, and of course, the node data information of the terminal network node may also be directly submitted as the registration information of the network node.

Then, the security verification module 71 carries out security verification on the registration information of the network node so as to guarantee the truth of the registration information of the network node.

Then, the node information memory module 72 generates and stores the node data information corresponding to the network node according to the registration information, subjected to security verification by the security verification module 71, of the network node. The node data information includes, but is not limited to, information such as a node name, network domain name information, a preset link and a certificate secure request of the network node, wherein the preset link of the network node refers to a link correlated to the domain name of the terminal network node in the network node encryption apparatus. Therefore, the network node encryption apparatus may store the node data information of a plurality of network nodes to form a preset database.

Next, the node information acquisition module 73 receives the node encryption request of a client terminal, and the node encryption request is a request that the user of the client terminal applies to the network node corresponding to the trusted third party for the encryption certificate so as to encrypt the network node.

Then, the node information acquisition module 73 acquires the node data information of the network node from the preset database according to the node encryption request. For example:

The domain name correlation detection unit 81 of the node information acquisition module 73 receives the node encryption request and detects whether the preset link of the network node is correlated to the domain name of the terminal network node or not according to the node encryption request, namely judge whether the node data information in the preset database is valid or not. The preset link may be a network address or a network memory space and the like.

If the preset link of the network node is correlated to the domain name of the terminal network node, the domain name correlation detection unit 81 determines that the node data information in the preset database is valid, the node information acquisition unit 82 acquires other node data information of the network node, and the trusted third party may verify the network node according to the node data information.

If the preset link of the network node is not correlated to the domain name of the terminal network node, the domain name correlation detection unit 81 determines that the node data information in the preset database is invalid, the domain name correlation prompt unit 83 sends a domain name correlation prompt to the corresponding client terminal to prompt the user to correlate the domain name of the terminal network node to the preset link of the network node so as to facilitate the automatic application operation of the encryption certificate.

Then, the certificate application module 74 applies to the trusted third party for the encryption certificate according to the node data information acquired by the node information acquisition module 73. The application for the encryption certificate herein refers to a request that the network node encryption apparatus applies to the trusted third party for the encryption certificate. The trusted third party herein is an entity, trusted by both communication parties, of a PKI (Public Key Infrastructure) system. For example:

The registration unit 91 of the certificate application module 74 carries out user registration on the trusted third party by using the node data information acquired by the node data information acquisition module so as to acquire registered user information.

The trusted third party provides service for applying for the encryption certificate for a registered user, and therefore, the certificate application module carries out user registration on the trusted third party by using the node data information in the step; and the node data information is subjected to security verification and validity verification, and therefore, the success rate of user registration is very high.

The certificate application unit 92 of the certificate application module 74 provides the certificate secure request of the network node for the trusted third party according to the registered user information acquired by the registration unit and the node data information so as to apply to the trusted third party for the encryption certificate, the node data information including the preset link.

Then, the trusted third party receives the application for the encryption certificate, sent by the certificate application module 74, and generates the certificate verification request according to the application for the encryption certificate. The certificate verification request refers to a request that the trusted third party verifies the application permission for the encryption certificate of the network node encryption apparatus. The certificate verification request should include a verification file, and the trusted third party downloads the verification file via a correlated link to determine a control right of the network node encryption apparatus to the correlated link.

The trusted third party sends the certificate verification request to the request receiving module 75; the request receiving module 75 receives the certificate verification request, and then, the correlation module 76 correlates the preset link of the network node to the verification file corresponding to the certificate verification request according to the certificate verification request. For example:

The verification file receiving unit 101 of the correlation module 76 receives the verification file corresponding to the certificate verification request from the trusted third party.

The correlation unit 102 of the correlation module 76 uploads the verification file to the memory space corresponding to the preset link so as to realize the correlation between the preset link of the network node and the verification file.

Then, the correlation module 76 returns the correlation result to the trusted third party, so that the trusted third party verifies the permission of the network node of the network node encryption apparatus. The correlation result shows that the verification file has been uploaded to the network address or the network memory space corresponding to the preset link of the network node.

Next, the trusted third party receives the correlation result of the correlation module 76 and affirms the correlation between the preset link of the network node and the verification file according to the correlation result. Namely, the trusted third party accesses the network address or the network memory space corresponding to the received preset link of the network node to affirm whether the verification file may be downloaded from the network address or the network memory space or not after receiving the correlation result returned by the network node encryption apparatus and used for showing that the verification file has been uploaded to the network address or the network memory space corresponding to the preset link of the network node. The corresponding encryption certificate is generated and sent to the certificate deployment module 77 if it is determined that the correlation exists between the preset link of the network node and the verification file, namely the trusted third party may access and download the verification file from the network address or the network memory space.

The certificate deployment module 77 receives the encryption certificate, and then, deploys the encryption certificate on the network node.

Finally, the feedback module 78 generates an encryption certificate deployment feedback after finishing the deployment of the encryption certificate, and sends the encryption certificate deployment feedback to the corresponding client terminal so as to remind a user of finishing the encryption operation of the network node.

Therefore, the encryption operation process of the network node of the network node encryption apparatus 70 in the embodiment is finished.

The node data information is subjected to security verification and validity verification by using the network node encryption apparatus in the embodiment on the basis of the above embodiments, so that the probability of verification failure of the trusted third party is reduced, and the success rate of encryption operation of the network node is further increased.

Figure 11:
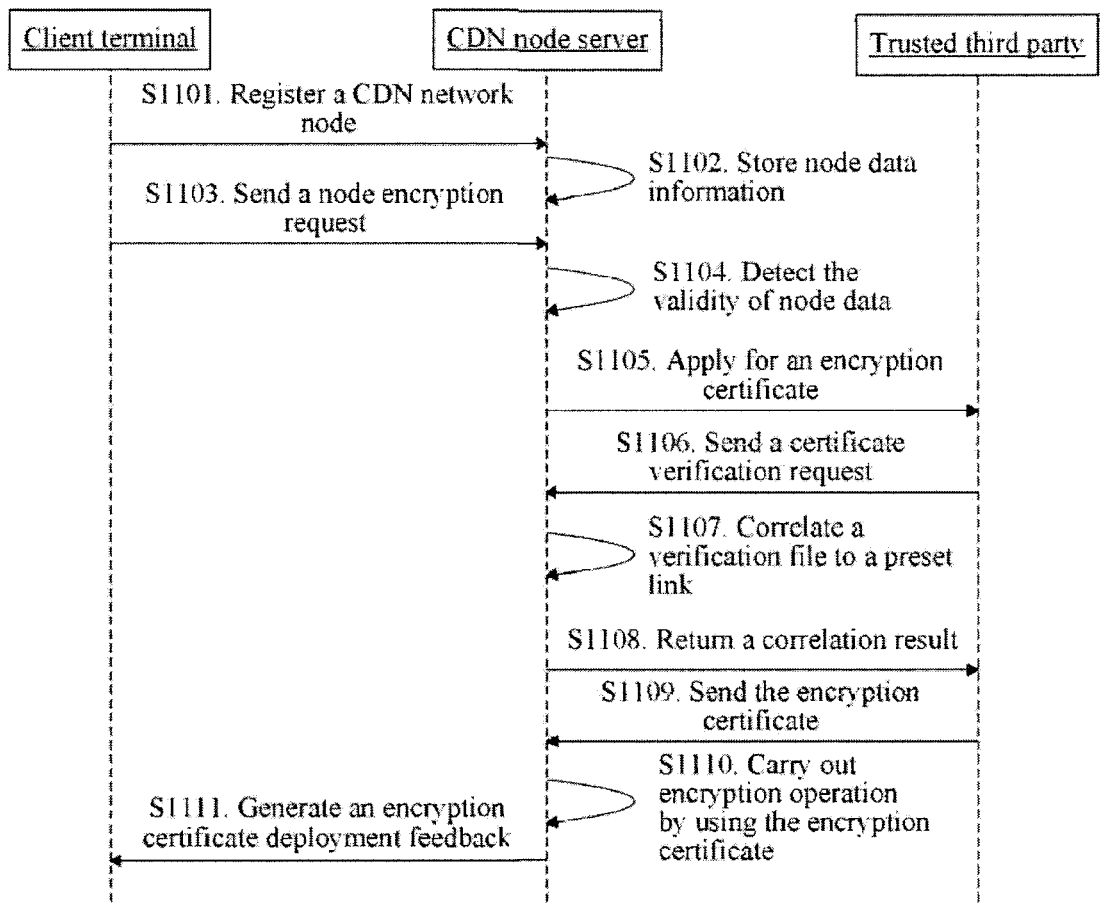
FIG. 11 is an implementation sequence diagram of a specific embodiment of the network node encryption method and apparatus of the present application.

The specific working principles of the network node encryption method and apparatus of the present application are described below in conjunction with a specific embodiment. Referring to FIG. 11 which is an implementation sequence diagram of the specific embodiment of the network node encryption method and apparatus of the present application. A user applies for a CDN node on a CDN node server via a client terminal and applies to the trusted third party for CDN node encryption via the CDN node server. An encryption process of the CDN node includes:

Step S1101: Register, by the user, the CDN node on the CDN node server via the client terminal, namely send, by the client terminal, the registration information of the CDN node to the CDN node server.

Step S1102: Carry out security verification, by the CDN node server, on the registration information of the CDN node, and then, store the registration information subjected to security verification as node data information of the CDN node. Therefore, the CDN node server may form a preset database including the node data information of a plurality of network nodes.

Step S1103: Send, by the user, a node encryption request to the CDN node server via the client terminal so as to encrypt a network content corresponding to the CDN node.

Step S1104: Detect, by the CDN node server, the validity of the node data information of the CDN node corresponding to the node encryption request.

Step S1105: Apply, by the CDN node server, to the trusted third party for an encryption certificate by using the node data information of the CDN node if the node data information of the CDN node is valid.

Step S1106: Send, by the trusted third party, a certificate verification request to the CDN node server according to the application for encryption certificate so as to verify whether the identity of an applicant and a domain name are valid or not. The certificate verification request includes a verification file.

Step S1107: Correlate, by the CDN node server, the verification file corresponding to the certificate verification request to the preset link of the CDN node, namely upload, by the CDN node server, the verification file to a network address or a network memory space corresponding to the preset link of the CDN node.

Step S1108: Return, by the CDN node server, a correlation result to the trusted third party. The correlation result shows that the verification file has been uploaded to the network address or the network memory space corresponding to the preset link of the CDN node.

Step S1109: Download, by the trusted third party, the verification file via the preset link of the CDN node after receiving the correlation result so as to determine a control right of the CDN node server to the CDN node, namely determine that the identify of the applicant and the domain name are valid, and then, send, by the trusted third party, the corresponding encryption certificate to the CDN node server.

Step S1110: Encrypt, by the CDN node server, the CDN node by using the encryption certificate.

Step S1111: Send, by the CDN node server, a corresponding encryption certificate deployment feedback to the client terminal after finishing the encryption operation of the CDN node so as to remind the user of finishing the encryption operation of the CDN node.

Therefore, the encryption process of the network node of the network node encryption method and apparatus in the specific embodiment is finished.

According to the network node encryption method and apparatus of the present application, the encryption certificate may be automatically applied from the trusted third party by using the node data information of the network node, and the network node is encrypted by using the encryption certificate, so that the leakage of the encryption certificate is avoided, and the security of the network node is improved.

Terms such as "assembly", "module", "system", "interface" and "process" used in the present application are generally intended to refer to computer-correlated entities: hardware, a combination of hardware and software, software or implementing software. For example, the assembly may include, but is not limited to, a process running on a processor, the processor, an object, an executable application, an executing thread, a program and/or a computer. As shown in the figure, both the application running on a controller and the controller may be assemblies. One or more assemblies may exist in the executing process and/or thread and may be located on one computer and/or distributed between two computers or among more computers.

Figure 12:
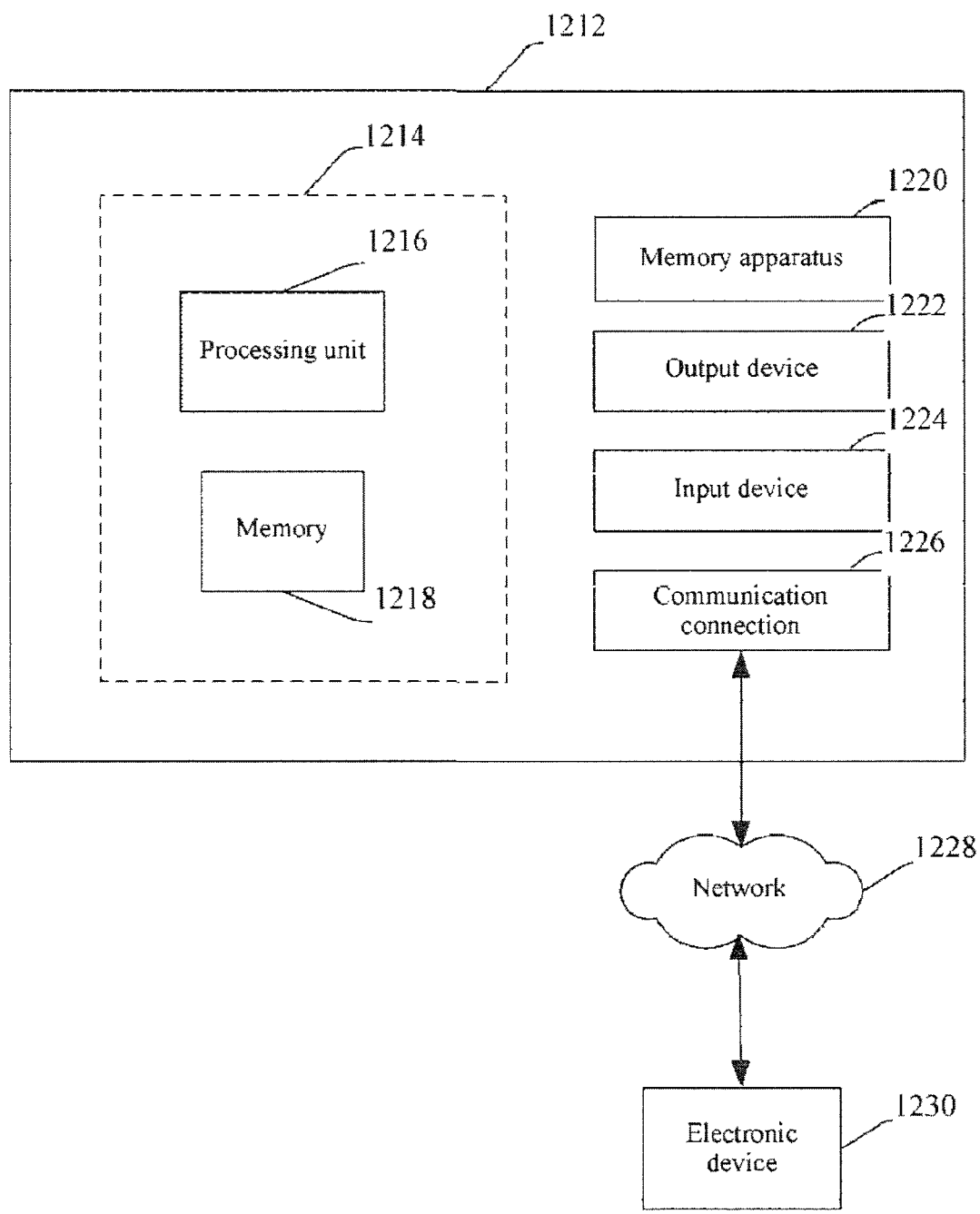
FIG. 12 is a schematic structural diagram of a working environment of an electronic device where the network node encryption apparatus of the present application is located.

A brief and general description for a working environment of an electronic device where the network node encryption apparatus for realizing the present application is located is provided in DIG. 12 and the subsequent discussion. The working environment of FIG. 12 is merely an example of an appropriate working environment, and is not intended to suggest any limitation on the purpose or function scope of the working environment. Examples of the electronic device 1212 include, but are not limited to, a wearable device, a head-mounted device, a medical and health platform, a personal computer, a server computer, a handheld or laptop device, a mobile device (such as a mobile phone, a personal digital assistant (PDA) and a media player), a multi-processor system, a consumption-type electronic device, a small-sized computer, a large-sized computer, a distributed computing environment including any one of the systems or devices and the like.

Although no demands are required, the embodiments are described under a general background that "computer-readable instructions" are executed by one or more electronic devices. The computer-readable instructions may be distributed by computer-readable mediums (discussed below). The computer-readable instructions may be realized as program modules such as a function of executing a specific task or realizing a specific abstract data type, an object, an application program interface (API) and a data structure. Typically, the functions of the computer-readable instructions may be randomly combined or distributed in various environments.

FIG. 12 shows an example of the electronic device 1212 including one or more embodiments of the network node encryption apparatus of the present application. In one configuration, the electronic device 1212 includes at least one processing unit 1216 and a memory 1218. The memory 1218 may be a volatile memory (such as RAM), a nonvolatile memory (such as ROM and a flash memory) or a certain combination of the volatile memory and the nonvolatile memory according to the exact configuration and type of the electronic device. The configuration is shown by a dashed line in FIG. 12.

In other embodiments, the electronic device 1212 may include additional features and/or functions. For example, the device 1212 may further include an additional memory apparatus (such as a removable memory apparatus and/or a non-removable memory apparatus) which includes, but is not limited to, a magnetic memory apparatus, an optical memory apparatus and the like. The additional memory apparatus is shown as a memory apparatus 1220 in FIG. 12. In one embodiment, the computer-readable instructions for realizing one or more embodiments provided herein may be in the memory apparatus 1220. The memory apparatus 1220 may further store other computer-readable instructions for realizing an operation system, an application program and the like. The computer-readable instructions may be stored into the memory 1218 and executed by, for example, the processing unit 1216.

The term "computer-readable mediums" used herein include computer memory mediums. The computer memory mediums include a volatile medium, a nonvolatile medium, a removable medium and a non-removable medium achieved by using any one method or technology of storing information such as the computer-readable instruction or other data. The memory 1218 and the memory apparatus 1220 are examples of the computer memory mediums. The computer memory mediums include, but are not limited to, an RAM, an ROM, an EEPROM, a flash memory or other memory technologies, a CD-ROM, a digital video disk (DVD) or other optical memory apparatuses, a cassette magnetic tape, a magnetic tape, a magnetic disk memory apparatus or other magnetic memory devices, or any other mediums which may be configured to store expected information and accessed by the electronic device 1212. Any one of such computer memory mediums may be a part of the electronic device 1212.

The electronic device 1212 may further include a communication connection 1226 allowing the electronic device 1212 to be in communication with other devices. The communication connection 1226 may include, but is not limited to, a modem, a network interface card (NIC), an integrated network interface, a radio-frequency transmitter/receiver, an infrared port, a USB connection or other interfaces configured to connect the electronic device 1212 to other electronic devices. The communication connection 1226 may include a wired connection or a wireless connection. The communication connection 1226 may transmit and/or receive communication mediums.

The term "computer-readable mediums" may include the communication mediums. The communication mediums typically include the computer-readable instructions or other data in a "modulated data signal" such as a carrier wave or other transmission mechanisms and include any information transfer mediums. The term "modulated data signal" may include such a signal: one or more of signal features are set or changed in a way of coding information into the signal.

The electronic device 1212 may include an input device 1224 such as a keyboard, a mouse, a pen, a voice input device, a touch input device, an infrared camera, a video input device and/or any other input devices. The device 1212 may further include an output device 1222 such as one or more displays, a loudspeaker, a printer and/or any other output devices. The input device 1224 and the output device 1222 may be connected to the electronic device 1212 by the wired connection, the wireless connection or any combinations of the wired connection and the wireless connection. In one embodiment, an input device or an output device from the other electronic device may be used as the input device 1224 or the output device 1222 of the electronic device 1212.

Assemblies of the electronic device 1212 may be connected by various interconnections (such as a bus). Such interconnections may include a peripheral assembly interconnection (PCI) (such as a quick PCI), a universal serial bus (USB), a fire wire (IEEE 1394), an optical bus structure and the like. In another embodiment, the assemblies of the electronic device 1212 may be interconnected by a network. For example, the memory 1218 may be composed of a plurality of physical memory units located on different physical positions and interconnected by the network.

A person skilled in the art will realize that the memory devices configured to store the computer-readable instructions may be distributed over the network. For example, an electronic device 1230 which may be accessed by virtue of a network 1228 may store the computer-readable instructions for realizing one or more embodiments of the present application. The electronic device 1212 may access the electronic device 1230 and download a part or all of the computer-readable instructions so that the computer-readable instructions are executed. Alternately, the electronic device 1212 may download a plurality of computer-readable instructions as required, or some instructions may be executed at the electronic device 1212, and some instructions may be executed at the electronic device 1230.

Various operations of the embodiments are provided herein. In one embodiment, one or more operations may construct the computer-readable instructions stored on one or more computer-readable mediums, and the operations are executed by a computing device when the computer-readable instructions are executed by the electronic device. The sequence for describing some or all the operations should not be explained to hint that the sequences of the operations have to be correlated. A person skilled in the art will understand replaceable rank ordering beneficial to the specification. Moreover, it should be understood that not all operations have to exist in each embodiment provided herein.

Moreover, although the present disclosure has been shown and described in one or more implementation ways, a person skilled in the part will have equivalent variations or modifications in the mind on the basis of reading and understanding the specification and the accompanying drawings. The present disclosure includes all the modification and variations and is merely limited by the scope of the appended claims. Particularly, for various functions executed by the assemblies (such as an element and a resource), the terms for describing such assemblies are intended to correspond to any assemblies (unless otherwise specified) executing appointed functions of the assemblies (such as the assemblies with equivalent functions) even if the structures are not equivalent with disclosed structures of the functions in an exemplary implementation way for executing the present disclosure herein. In addition, although the specific feature of the present disclosure has been disclosed relative to one of a plurality of implementation ways, the feature may be combined with one or more other features of other implementation ways which may be expected and beneficial for a given or specific application. Moreover, the terms "include", "be provided with", "comprise" or variants thereof are intended to cover an inclusion in a way similar to the term "comprise" if being used in description of embodiments or claims.

Each functional unit in the embodiment of the present application may be integrated in one processing module, or each unit physically exists alone, or two or more units are integrated in one module. The integrated module may be achieved in a hardware way or a software functional module way. The integrated module may also be stored in one computer-readable access medium if being achieved in the software functional module way and sold or used as an independent product. The memory medium mentioned above may be a read-only memory, a magnetic disk or an optical disk and the like. Each of the apparatuses or systems may execute a method in corresponding method embodiments.

In conclusion, although the present application has been disclosed above through the embodiments, the embodiments are not intended to limit the present application. A person of ordinary skilled in the art may make various alterations and modifications without departing from the spirit and scope of the present application, and therefore, the protection scope of the present application is subject to the scope defined by claims.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for network node encryption, comprising:
receiving, by interface circuitry of an apparatus for controlling network nodes, a node encryption request for a network node;
acquiring, by processing circuitry of the apparatus, and from a network node information database, node data information of the network node according to the node encryption request, the node data information including a preset link that is not included in the node encryption request;
transmitting, via the interface circuitry, an application to a trusted third party for an encryption certificate, the application including the node data information;
receiving, via the interface circuitry, a certificate verification request from the trusted third party, the certificate verification request including a verification file to be used to verify an authority to the preset link, and the certificate verification request being generated by the trusted third party in response to the application for the encryption certificate;
storing the verification file according to the preset link of the network node to associate the verification file with the preset link in response to the certificate verification request;
transmitting, via the interface circuitry, a message to the trusted third party to inform of a completion of the storing the verification file;
receiving, via the interface circuitry, the encryption certificate from the trusted third party, the encryption certificate being generated by the trusted third party in response to the message; and
deploying, by the processing circuitry, the encryption certificate on the network node.

2. The method according to claim 1, further comprising:
receiving registration information of the network node;
conducting a security verification based on the registration information of the network node; and
generating and storing the node data information of the network node in the network node information database when the security verification has been conducted successfully.

3. The method according to claim 1, further comprising:
detecting whether the preset link of the network node is valid.

4. The method according to claim 3, wherein the detecting whether the preset link of the network node is valid further comprises:
detecting whether the preset link enables access to a domain name of a terminal network node.

5. The method according to claim 3, further comprising:
acquiring other node data information of the network node when the preset link of the network node is valid; or sending a prompt when the preset link of the network node is invalid.

6. The method according to claim 1, wherein the transmitting the application to the trusted third party for the encryption certificate comprises:
acquiring registered user information from the trusted third party after a user registration is completed in the trusted third party based on the node data information; and
providing, via the interface circuitry, a certificate secure request of the network node to the trusted third party according to the registered user information and the node data information, the certificate secure request causing the application to the trusted third party for the encryption certificate.

7. The method according to claim 1, wherein the storing the verification file according to the preset link of the network node to associate the verification file with the preset link in response to the certificate verification request comprises:
receiving the verification file in response to the certificate verification request; and
uploading the verification file to a memory space corresponding to the preset link, to associate the preset link of the network node with the verification file.

8. The method according to claim 1, wherein after the deploying the encryption certificate on the network node, the method further comprises:
generating a deployment feedback after the encryption certificate is deployed; and
sending the deployment feedback to a corresponding client terminal that generates the node encryption request.

9. The method according to claim 1, wherein the acquiring the node data information of the network node from the network node information database according to the node encryption request comprises:
acquiring the node data information from a preset database, and the preset database pre-storing the node data information of the network node, and the node data information including at least one of a node name, a network domain name, the preset link, or a certificate secure request of the network node.

10. An apparatus, comprising:
interface circuitry configured to receive and transmit messages; and
processing circuitry configured to:
receive, via the interface circuitry, a node encryption request for a network node;
acquire node data information of the network node from a network node information database in response to the node encryption request, the node data information including a preset link that is not included in the node encryption request;
transmit, via the interface circuitry, an application to a trusted third party for an encryption certificate, the application including the node data information;
receive, via the interface circuitry, a certificate verification request from the trusted third party, the certificate verification request including a verification file to be used to verify an authority to the preset link, and the certificate verification request being generated by the trusted third party in response to the application for the encryption certificate;
store the verification file according to the preset link of the network node to associate the verification file with the preset link in response to the certificate verification request;
transmit, via the interface circuitry, a message to the trusted third party to inform of a completion of the storing the verification file according to the preset link of the network node;
receive, via the interface circuitry, the encryption certificate from the trusted third party, the encryption certificate being generated by the trusted third part in response to the message; and
deploy the encryption certificate on the network node.

11. The apparatus according to claim 10, wherein the processing circuitry is further configured to:

receive, via the interface circuitry, registration information of the network node;
conduct a security verification based on the registration information of the network node; and
generate and store the node data information of the network node in the network node information database when the security verification has been conducted successfully.

12. The apparatus according to claim 10, wherein the processing circuitry is further configured to:
detect whether the preset link of the network node is valid.

13. The apparatus according to claim 12, wherein the processing circuitry is further configured to:
detect whether the preset link enables access to a domain name of a terminal network node.

14. The apparatus according to claim 12, wherein the processing circuitry is further configured to:
acquire other node data information of the network node when the preset link of the network node is valid; and
send a prompt when the preset link of the network node is invalid.

15. The apparatus according to claim 10, wherein the processing circuitry is further configured to:
acquire registered user information from the trusted third party after a user registration is completed by the trusted third party based on the node data information; and
provide, via the interface circuitry, a certificate secure request of the network node to the trusted third party according to the registered user information and the node data information, the certificate secure request causing the application to the trusted third party for the encryption certificate.

16. The apparatus according to claim 10, wherein the processing circuitry is further configured to:
receive the verification file in response to the certificate verification request; and
upload the verification file to a memory space corresponding to the preset link to associate the preset link of the network node with the verification file.

17. The apparatus according to claim 16, wherein the processing circuitry is further configured to:
generate a deployment feedback after the encryption certificate is deployed; and
send the deployment feedback to a corresponding client terminal that generates the node encryption request.

18. A method for network node encryption, the method comprising:
receiving, by interface circuitry of a first apparatus for providing encryption certificates, an encryption certificate application from a second apparatus that controls network nodes, the encryption certificate application including node data information of a network node, the node data information including a preset link;
generating, by processing circuitry of the first apparatus, a certificate verification request in response to the encryption certificate application, the certificate verification request including a verification file to be used to verify an authority to the preset link;
sending, via the interface circuitry of the first apparatus, the certificate verification request including the verification file to the second apparatus;
receiving, via the interface circuitry of the first apparatus, a message fed back by the second apparatus in response to the certificate verification request, the message informing the first apparatus of a completion by the second apparatus of uploading the verification file to at least one of a network address and a network memory space specified by the preset link of the network node;
in response to receiving the message from the second apparatus, downloading, by the processing circuitry of the first apparatus, the verification file from at least one of the network address and the network memory space; and
in response to successfully downloading the verification file,
(i) determining, by the processing circuitry of the first apparatus, that the verification file and the preset link are associated with each other,
(ii) generating, by the processing circuitry of the first apparatus, a corresponding encryption certificate in response to the message; and
(iii) sending, via the interface circuitry of the first apparatus, the encryption certificate to the second apparatus.

19. The method of claim 18, wherein the node data information of the network node is generated when a security verification based on registration information of the network node is conducted successfully.

20. The method of claim 18, wherein the second apparatus, in response to receiving the encryption certificate from the first apparatus, performs an encryption operation in accordance with the encryption certificate.

* * * * *